US008577714B2

(12) United States Patent
Yokota et al.

(10) Patent No.: US 8,577,714 B2
(45) Date of Patent: Nov. 5, 2013

(54) BUSINESS INFORMATION MANAGEMENT SYSTEM, BUSINESS INFORMATION MANAGEMENT METHOD, AND BUSINESS INFORMATION MANAGEMENT PROGRAM

(75) Inventors: Takeshi Yokota, Hitachi (JP); Kenji Araki, Mito (JP); Masanori Takamoto, Tokyo (JP); Masatoshi Takada, Hitachi (JP); Tsuyoshi Niino, Tokyo (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 1765 days.

(21) Appl. No.: 11/866,583

(22) Filed: Oct. 3, 2007

(65) Prior Publication Data

US 2008/0086347 A1    Apr. 10, 2008

(30) Foreign Application Priority Data

Oct. 5, 2006   (JP) ................................ 2006-273928

(51) Int. Cl.
*G06Q 10/00*    (2012.01)
(52) U.S. Cl.
USPC ..................................................... 705/7.27
(58) Field of Classification Search
USPC ................................................ 705/7.11–7.42
See application file for complete search history.

(56) References Cited

U.S. PATENT DOCUMENTS

| 7,187,683 | B1 * | 3/2007 | Sandoval et al. | 370/410 |
| 7,333,923 | B1 * | 2/2008 | Yamanishi et al. | 703/2 |
| 2005/0273378 | A1 * | 12/2005 | MacDonald-Korth et al. | 705/10 |
| 2006/0015380 | A1 * | 1/2006 | Flinn et al. | 705/7 |
| 2006/0155564 | A1 * | 7/2006 | Fisher et al. | 705/1 |
| 2006/0236254 | A1 * | 10/2006 | Mateescu et al. | 715/762 |
| 2007/0021992 | A1 * | 1/2007 | Konakalla | 705/7 |
| 2008/0255905 | A1 * | 10/2008 | Cole et al. | 705/7 |

FOREIGN PATENT DOCUMENTS

| JP | 07-200658 | 8/1995 |
| JP | 09-198291 | 7/1997 |
| JP | 2000-259703 | 9/2000 |
| JP | 2003-115012 | 4/2003 |
| JP | 2003-345956 | 12/2003 |
| JP | 2004-240486 | 8/2004 |
| JP | 2005-032079 | 2/2005 |
| JP | 2005-216020 | 8/2005 |
| JP | 2005-301973 | 10/2005 |
| JP | 2006-127314 | 5/2006 |

OTHER PUBLICATIONS

Office Action in Japanese Application No. 2006-273928 mailed May 24, 2011.

* cited by examiner

*Primary Examiner* — Jonathan G Sterrett
(74) *Attorney, Agent, or Firm* — Brundidge & Stanger, P.C.

(57) ABSTRACT

A business information management system includes a data connection relationship information storage section storing connection relationships of data items forming a business information database, a data connection accuracy information storage section that stores data connection accuracy between data item pairs having a connection relationship, and a data change section that changes data in the business information database by inputting data thereto. A change affected data extraction section extracts change affected data items by tracing first data items having a connection relationship with an originally changed data item and second data items having a connection relationship with the first data items until there is no connection relationship, a change effect probability calculation section calculates change effect probability of the change affected data based on data connection accuracy, and a change affected data display section displays the change effect probability on a display unit.

12 Claims, 16 Drawing Sheets

FIG.4A

WORK FLOW INFORMATION

| COMMON ID | WF-ID | P-No | PROCESS NAME | BRANCH CONDITION | UPPER LEVEL P-No | LOWER LEVEL P-No |
|---|---|---|---|---|---|---|
| 0101001 | 1 | 1 | ACQUIRE INQUIRY INFORMATION | | | 2 |
| 0101002 | 1 | 2 | REQUEST ESTIMATION | | 1 | 3,4 |
| 0101003 | 1 | 3 | COORDINATE CONFLICT OF INTEREST AMONG IN-HOUSE DIVISIONS CONCERNED | IN-HOUSE PARTS | 2 | 5 |
| 0101004 | 1 | 4 | SUPPLIER DOCUMENTATION | PARTS SUPPLIED FROM OUTSIDE SUPPLIERS | 2 | 6 |
| ...... | | | ......... | ......... | ... | ... |

FIG.4B

CONTRACT INFORMATION

| COMMON ID | CO-ID | A-No | CONTRACT CLAUSE NAME | CONTRACT CLAUSE DETAIL |
|---|---|---|---|---|
| 0201001 | 1 | 1 | EXCHANGE RISK | BORNE BY CUSTOMER |
| 0201002 | 1 | 2 | PAYMENT TERMS | AT END OF ACCEPTANCE |
| 0201003 | 1 | 3 | DEFECT GUARANTEE PERIOD | 2 YEARS |
| 0201004 | 1 | 4 | ORDER VALUE | 1000000000 YEN |
| ...... | | ... | ......... | ......... |

FIG.4C

PRODUCT INFORMATION

| COMMON ID 113 | PRODUCT ID 114 | PART No 115 | PART NAME 116 | PART CAD INFORMATION ID 117 |
|---|---|---|---|---|
| 0301001 | 1 | 1 | PUMP 001 | P001-02720060620 |
| 0301002 | 1 | 2 | PUMP 002 | P002-02720060514 |
| 0301003 | 1 | 3 | SPOOL 001 | H001-01420060520 |
| 0301004 | 1 | 4 | SUPPORT 001 | S001-01420060603 |
| ...... | ... | ... | ......... | ......... |

FIG.5

| | CHANGE DATA INPUT | | |
|---|---|---|---|

DATA CATEGORY

CONTRACT ▼

201

DATA LIST  202    203

| No. | CONTRACT CLAUSE NAME | |
|---|---|---|
| 1 | EXCHANGE RISK | ✓ |
| 2 | PAYMENT TERMS | |
| 3 | DEFECT GUARANTEE PERIOD | |
| 4 | ORDER VALUE | |

DATA DETAIL  204

BORNE BY CUSTOMER

CHANGE VALIDATE  205    CANCEL  206

(DATA CONNECTION RELATIONSHIP INFORMATION)

| SOURCE DATA (301) | DESTINATION DATA (302) |
|---|---|
| 0201001 | 1201005, 2302012 |
| 0201002 | 0501002 |
| 0201003 | 0305002, 0401015, 0701001 |
| 0201004 | 1002006 |
| ...... | ...... |

FIG.8

(DATA CONNECTION CONDITION INFORMATION)

| SOURCE DATA (401) | DESTINATION DATA (402) | CONNECTION CONDITION (403) |
|---|---|---|
| 0201001 | 2302012 | data001>10 |
| 0201003 | 0401015 | data005=1 |
| 0201010 | 0801001 | data002=1 & data003=0 |
| 0201012 | 1502005 | data015=15 |
| ...... | ...... | ...... |

FIG.10

(DATA CONNECTION ACCURACY INFORMATION)

| SOURCE DATA (501) | DESTINATION DATA (502) | CONNECTION ACCURACY (503) |
|---|---|---|
| 0201001 | 1201005 | 0.8 |
|  | 2302012 | 0.4 |
| 0201002 | 0501002 | 1 |
| 0201003 | 0305002 | 0.6 |
|  | 0401015 | 1 |
|  | 0701001 | 0.5 |
| 0201004 | 1002006 | 0.4 |
| ...... | ......... | ...... |

FIG.12

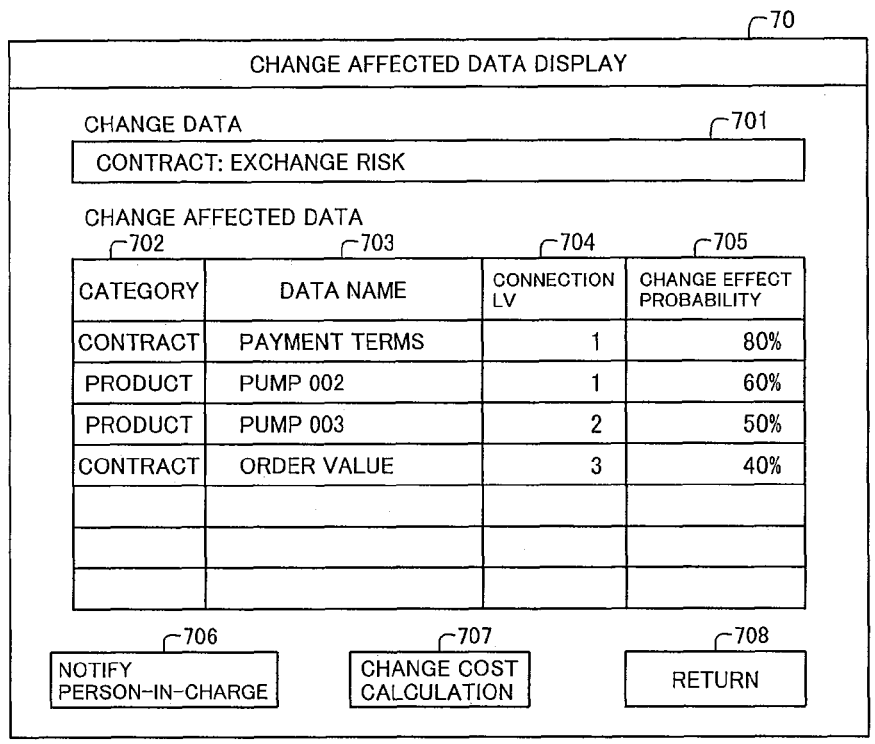

CHANGE AFFECTED DATA DISPLAY — 70

CHANGE DATA — 701
CONTRACT: EXCHANGE RISK

CHANGE AFFECTED DATA

| CATEGORY (702) | DATA NAME (703) | CONNECTION LV (704) | CHANGE EFFECT PROBABILITY (705) |
|---|---|---|---|
| CONTRACT | PAYMENT TERMS | 1 | 80% |
| PRODUCT | PUMP 002 | 1 | 60% |
| PRODUCT | PUMP 003 | 2 | 50% |
| CONTRACT | ORDER VALUE | 3 | 40% |
|  |  |  |  |
|  |  |  |  |
|  |  |  |  |

706: NOTIFY PERSON-IN-CHARGE | 707: CHANGE COST CALCULATION | 708: RETURN

FIG.13

(PERSON-IN-CHARGE INFORMATION)

| COMMON ID (601) | NAME OF PERSON IN CHARGE (602) | TITLE (603) | E-MAIL ADDRESS (604) |
|---|---|---|---|
| 0101001 | TARO YAMADA | ENGINEER | a01@bbb |
|  | ICHIRO SAITO | MANAGER | aaa@bbb |
| 0101002 | ICHIRO SUZUKI | ENGINEER | a02@bbb |
| 0101003 | JIRO TANAKA | ENGINEER | a03@bbb |
|  | ICHIRO SAITO | MANAGER | aaa@bbb |
|  | JIRO SATO | GENERAL MANAGER | ccc@bbb |
| 0101004 | ICHIRO YAMAKAWA | ENGINEER | a04@bbb |
| ...... | ......... | ......... | ......... |

(CHANGE COST INFORMATION)

| SOURCE DATA | DESTINATION DATA | CHANGE COST |
|---|---|---|
| 0201001 | 1201005 | 10000 |
| | 2302012 | 5000 |
| 0201002 | 0501002 | 25000 |
| 0201003 | 0305002 | 800 |
| | 0401015 | 15000 |
| | 0701001 | 1250 |
| 0201004 | 1002006 | 4800 |
| ...... | ......... | ...... |

(CHANGE COST CALCULATION PROCESSING)

FIG.18

CHANGE COST ESTIMATED VALUE DISPLAY — 130

CHANGE DATA — 1301

| CONTRACT: EXCHANGE RISK |
|---|

CHANGE EFFECT COST

| CATEGORY (1302) | DATA NAME (1303) | COST EFFECT VALUE (1304) |
|---|---|---|
| CONTRACT | PAYMENT TERMS | 125000 |
| PRODUCT | PUMP 002 | 1200 |
| PRODUCT | PUMP 003 | 8500 |
| CONTRACT | ORDER VALUE | 4500 |
|  |  |  |
|  |  |  |
|  |  |  |

CORPORATE-WIDE CHANGE COST ESTIMATED VALUE: 139200 — 1305

RETURN — 1306

BUSINESS INFORMATION MANAGEMENT SYSTEM, BUSINESS INFORMATION MANAGEMENT METHOD, AND BUSINESS INFORMATION MANAGEMENT PROGRAM

BACKGROUND OF THE INVENTION

1. Field of the Invention

The present invention relates to a business information management system, a business information management method, and a business information management program that manage business information covering from product development through production.

2. Description of the Related Art

Known as a system for integrally managing information of various sorts in processes from product design through manufacturing is, what is called, the PDM (Product Data Management) system. The PDM system manages not only product information, such as design specifications, CAD (Computer Aided Design) information, parts list information, and manufacturing instruction sheets for each product, but also link information mutually connecting the foregoing various types of information. When an engineering change is to be made of a product, therefore, the PDM system allows information or documents affected by the specific engineering change concerned to be easily extracted based on the link information. This enables efficient engineering change and the like. JP-A-2006-127314 is an example of the related art.

SUMMARY OF THE INVENTION

The PDM system of the known art, however, involves an inconvenience that may result from an attempt made to expand the scope of information to be managed to include overall business information, such as product developmental plan information, contract information, and work flow information, in addition to the product design and manufacturing information.

In the conventional PDM system, the link information mutually connecting the different types of information is given as "related" or "unrelated" definitive information within what is called the relational database. The developmental plan information, contract information, work flow information, and the like, however, change daily depending on situations. It is also often the case that a mutual relationship among the foregoing types of information cannot be uniquely defined. Accordingly, the link information of these different types of information entails ambiguity, as being "probably related," instead of being definitively "related" or "unrelated." Specifically, the conventional PDM system does not contain a concept of the link information entailing ambiguity of "being probably related." Consequently, when a specific type of information is to be changed in, for example, the developmental plan information, it is not possible to extract appropriately other types of information that are "probably related" to the specific type of information. There is therefore likelihood that the other types of information affected by the specific type of information that has been changed are not properly changed or reassessed as appropriately.

The present invention addresses the above-identified and other problems associated with the known PDM system. It is an object of the present invention to provide a business information management system, a business information management method, and a business information management program capable of enhancing reliability in business information. The business information management system, method, and program achieve the foregoing object by, even if various types of business information including product developmental plan information, contract information, and work flow information are unable to establish definitively link information that mutually connects these various types of business information, eliminating omission in making changes or reassessment of other types of data that become necessary as a result of a specific type of data contained in the business information being changed.

An embodiment of the present invention provides a business information management system, a business information management method, and a business information management program that use a computer including at least an input unit and a display unit to manage a business information database containing data of a plurality of types concerning a business. To solve the foregoing problems in prior art, aspects of the present invention provide the following. Specifically, (1) The computer includes (1-1) a data connection relationship information storage means storing data connection relationship information that represents data having a connection relationship with each of data items constituting the business information database and (1-2) a data connection accuracy information storage means storing, as data connection accuracy, a numeric value that represents a depth of the connection relationship for each pair of data items having a connection relationship stored in the data connection relationship information storage means.

(2) The computer then executes the following steps: (2-1) changing at least one data item contained in the business information database using data inputted via the input unit; (2-2) obtaining, based on the data connection relationship information stored in the data connection relationship information storage means, a first data item that has a connection relationship with the originally changed data item and a second data item that has a connection relationship with the first data item, until there is no longer existing connection relationship, and extracting, as change affected data, all data items resident along a path connecting the above-referenced connection relationships; (2-3) calculating a change effect probability of each item of the extracted change affected data based on the data connection accuracy stored in the data connection accuracy information storage means; and (2-4) displaying on the display unit the extracted change affected data and the change effect probability calculated for the change affected data.

In accordance with the aspects of the present invention, the computer managing the business information database includes storage means (the data connection relationship information storage means and the data connection accuracy information storage means) that store, for each of data items constituting the business information database, a data item having a connection relationship therewith and a numeric value (data connection accuracy) indicating a depth of relationship between each pair of data items having the connection relationship with each other. The computer is therefore able, when an input is made to change any given data item contained in the business information database, to extract easily the data items having the connection relationship with the changed data item. The connection relationship is, at this time, represented by the data connection accuracy indicating the depth of the connection relationship. Accordingly, an ambiguous connection relationship of "being probably related" can be represented. It is therefore possible to extract even a type of data having an ambiguous connection relationship with the changed data item.

According to the business information management system, the business information management method, and the business information management program of the present invention, even if various types of business information including product developmental plan information, contract information, and work flow information are unable to establish definitively link information (data connection relationship information) that mutually connects these various types of business information, omission can be eliminated in making changes or reassessment of other types of data that become necessary as a result of a specific type of data contained in the business information being changed. As a result, reliability of the business information can be enhanced.

BRIEF DESCRIPTION OF THE DRAWINGS

The present invention will be described with reference to the accompanying drawings.

FIGS. 4A, 4B, and 4C are tables showing typical compositions of data for each category of data constituting part of a business information database according to the embodiment of the present invention, FIG. 4A showing an example of work flow information, FIG. 4B showing an example of contract information, and FIG. 4C showing an example of product information.

FIG. 5 is a view showing a typical change data input screen displayed on a display unit during processing performed for achieving the function of a data change section according to the embodiment of the present invention.

FIG. 7 is a table showing typical compositions of data relating to data connection relationship information stored in a data connection relationship information storage section according to the embodiment of the present invention.

FIG. 8 is a table showing typical compositions of data relating to data connection condition information stored in a data connection condition information storage section according to the embodiment of the present invention.

FIG. 10 is a table showing typical compositions of data relating to data connection accuracy information stored in a data connection accuracy information storage section according to the embodiment of the present invention.

FIG. 12 is a view showing a typical change affected data display screen displayed on the display unit during processing performed for achieving the function of a change affected data display section according to the embodiment of the present invention.

FIG. 13 is a table showing typical compositions of data relating to person-in-charge information stored in a person-in-charge information storage section according to the embodiment of the present invention.

FIG. 18 is a view showing a typical change cost estimated value display screen displayed on the display unit during processing performed for achieving the function of a change cost display section according to the embodiment of the present invention.

DETAILED DESCRIPTION OF THE PREFERRED EMBODIMENTS

A specific embodiment to which the present invention is applied will be described in detail below with reference to the drawings.

Figure 1:
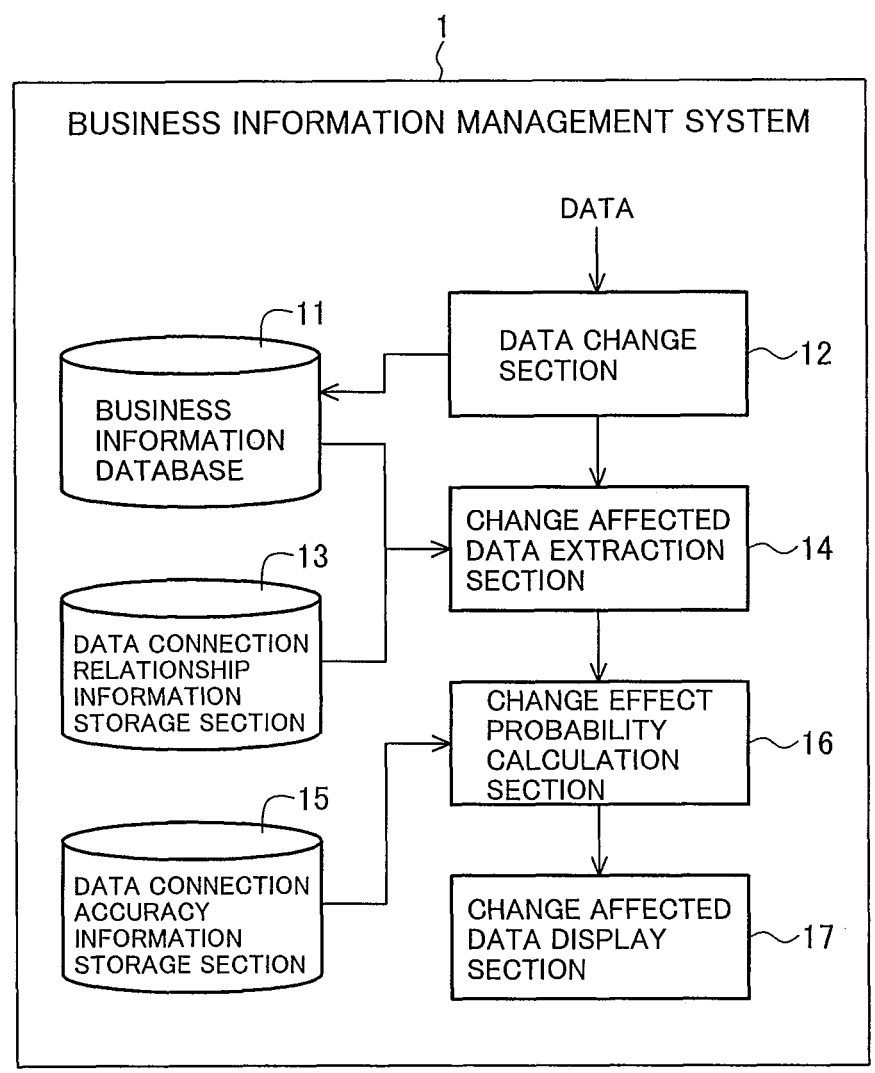
FIG. 1 is a block diagram showing a basic configuration of a business information management system according to an embodiment of the present invention.

FIG. 1 is a block diagram showing a basic configuration of a business information management system according to an embodiment of the present invention. Referring to FIG. 1, a business information management system 1 includes various types of functional blocks, such as a business information database 11, a data change section 12, a data connection relationship information storage section 13, a change affected data extraction section 14, a data connection accuracy information storage section 15, a change effect probability calculation section 16, and a change affected data display section 17.

The above-referenced functional blocks are configured on a computer having an input unit, a display unit, a processing unit, a storage unit, and the like not shown. Of those functional blocks, the business information database 11, the data connection relationship information storage section 13, and the data connection accuracy information storage section 15 are configured on the storage unit. The function of each of the data change section 12, the change affected data extraction section 14, the change effect probability calculation section 16, and the change affected data display section 17 is achieved when the processing unit of the computer executes a corresponding program stored in the storage unit.

The business information database 11 stores such information as it relates to performance of business activities, including developmental plan information, contract information, work flow information, product design information, and product manufacturing information. The business information database 11 may include a management function therefore (the function that is achieved by the processing unit's executing, what is called, a database management program).

The data connection relationship information storage section 13 stores data having a connection relationship with each of data items making up the business information database 11. Further, the data connection accuracy information storage section 15 stores a numeric value indicating a depth of relationship between each pair of data items having the connection relationship with each other, stored in the data connection relationship information storage section 13.

To perform processing for achieving the function of the data change section 12, the processing unit of the computer for the business information management system 1 changes, on receipt, from the input unit such as a keyboard, of an input of change data concerned with the business information database 11, a specific data item to be changed stored in the business information database 11 by using the input data. Further, to perform processing for achieving the function of the change affected data extraction section 14, the processing unit refers to the data connection relationship information storage section 13 and extracts change affected data items. Specifically, the processing unit identifies, by referring to the data connection relationship information storage section 13, first data items that have a connection relationship with the originally changed data item and second data items that have a connection relationship with the first data items. The processing unit repeats these steps until the connection relationship no longer exists. Data items resident along a path of the connection relationship are thus extracted as the change affected data items.

The processing unit next performs processing for achieving the function of the change effect probability calculation section 16 as follows. Specifically, the processing unit calculates a change effect probability of the extracted change affected data items based on data connection accuracy stored in the data connection accuracy information storage section 15. The processing unit then performs processing for achieving the function of the change affected data display section 17 as follows. Specifically, the processing unit displays on the display unit the above-referenced change affected data items extracted and the change effect probability calculated for the change affected data items.

An administrator or a user of the business information database 11 is able to identify, from the change affected data items and the change effect probability displayed on the display unit, the specific data items that are affected by the originally changed data item, together with the degree of effect of the change (change effect probability) for each of these data items.

Figure 2:
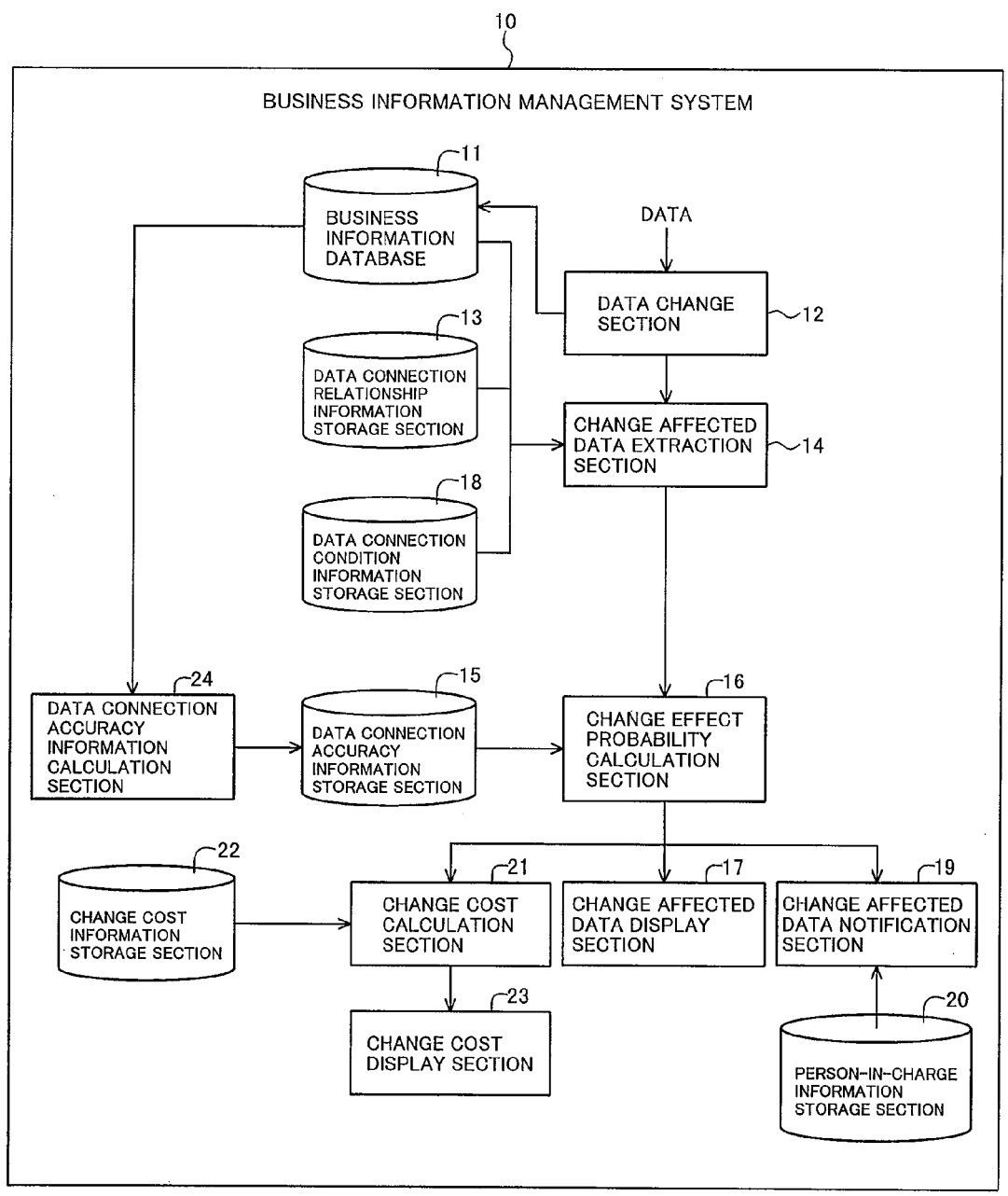
FIG. 2 is a block diagram showing an expanded configuration of a business information management system according to an embodiment of the present invention.

FIG. 2 is a block diagram showing an expanded configuration of a business information management system according to another embodiment of the present invention. Referring to FIG. 2, a business information management system 10 according to the expanded configuration further includes, in addition to the functional blocks constituting the business information management system 1 according to the basic configuration, a data connection condition information storage section 18, a change affected data notification section 19, a person-in-charge information storage section 20, a change cost calculation section 21, a change cost information storage section 22, a change cost display section 23, a data connection accuracy information calculation section 24, and the like.

In the same manner as in the business information management system 1 according to the basic configuration, these functional blocks are configured on a computer having an input unit, a display unit, a processing unit, a storage unit, and the like not shown. Of those functional blocks, the business information database 11, the data connection relationship information storage section 13, the data connection accuracy information storage section 15, the data connection condition information storage section 18, the person-in-charge information storage section 20, and the change cost information storage section 22 are configured on the storage unit. The function of each of the data change section 12, the change affected data extraction section 14, the change effect probability calculation section 16, the change affected data display section 17, the change affected data notification section 19, the change cost calculation section 21, the change cost display section 23, and the data connection accuracy information calculation section 24 is achieved when the processing unit of the computer executes a corresponding program stored in the storage unit.

Functions of the functional blocks constituting the business information management system 10 will next be described. Descriptions of the functions performed by the functional blocks included in the business information management system 1 according to the basic configuration are the same and will be omitted in the following.

The data connection condition information storage section 18 stores data connection condition information. The data connection condition information represents conditions for validating a connection relationship for each pair of data items having the connection relationship stored in the data connection relationship information storage section 13. In performing processing for achieving the function of the change affected data extraction section 14, the processing unit identifies all data items that have the connection relationship with the originally changed data item until there is no connection relationship existing. At this time, if the data connection condition information corresponding to the connection relationship is stored in the data connection condition information storage section 18, the processing unit determines that the connection relationship holds on conditions that the data connection conditions are satisfied.

The person-in-charge information storage section 20 stores, for each of the data items constituting the business information database 11, information on the person in charge concerned with the data item. In performing processing for achieving the function of the change affected data notification section 19 at this time, the processing unit refers to the person-in-charge information storage section 20 to extract persons in charge concerned with the change affected data, if the change effect probability of the change affected data items calculated by the change effect probability calculation section 16 is equal to, or more than, a predetermined value. The processing unit thereby notifies the extracted persons in charge of the change affected data items and the change effect probability.

The change cost information storage section 22 stores, for each of the data items constituting the business information database 11, information on a change cost to be accrued when the data item is changed. In performing processing for achieving the function of the change cost calculation section 21 at this time, the processing unit calculates, for each of the change affected data items extracted through the processing for the change affected data extraction section 14, the change cost of the change affected data item. The processing unit calculates the change cost of the change affected data item as the product of the change cost stored in the change cost information storage section 22 for that particular change affected data item and the change effect probability calculated for that particular change affected data item through the processing performed for the change effect probability calculation section 16. The processing unit further adds up all change cost values calculated for the change affected data items to find the total value. Additionally, in performing processing for achieving the function of the change cost display section 23, the processing unit displays at least one of the change cost value calculated of each change affected data and the total value.

The business information database 11 includes the work flow information that defines a work flow including a plurality of work processes (hereinafter referred to simply as "processes"). In performing processing for achieving the function of the data connection accuracy information calculation section 24, the processing unit selects from the work flow information a first process and a second process carried out following the first process. Based on the work flow information, the processing unit finds a process connection path leading from the first process to the second process. Then, based on the number of connection links contained in the connection path and the number of connection link branches branching rearwardly from the process contained in the connection path, the processing unit calculates data connection accuracy between a first data item to be processed in the first process and a second data item to be processed in the second process.

In the business information management systems 1, 10 shown in FIGS. 1 and 2, each of the various functional blocks is not necessarily configured on a single computer. The functional blocks may be configured on a plurality of computers. For example, the business information database 11 may be configured on a computer that is different from the computer achieving other functional blocks. Alternatively, the block having the input or display function may be configured on a computer that is different from the computer achieving other functional blocks. The plurality of computers achieving the business information management systems 1, 10 is generally connected to each other through a network, such as Ethernet (a registered trademark) or the like.

The business information management system 10 according to the expanded configuration will be described in detail below with reference to FIGS. 3 through 19. The detailed description includes that of the business information management system 1 according to the basic configuration. Accordingly, the detailed description of the business information management system 1 according to the basic configuration will be omitted.

Figure 3:
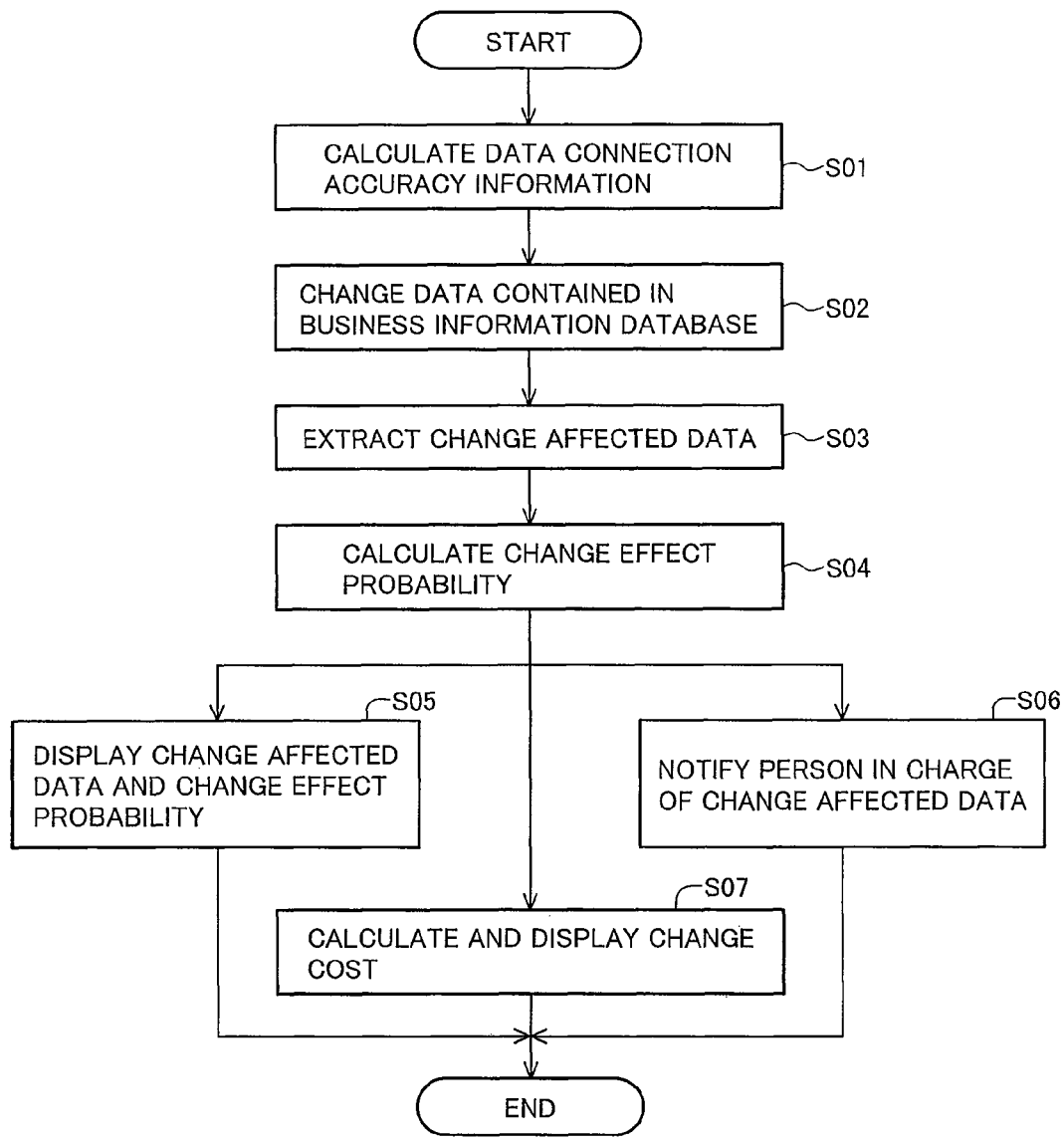
FIG. 3 is a flowchart showing a schematic flow of processing performed by the business information management system according to the embodiment of the present invention.

FIG. 3 is a flowchart showing a schematic flow of processing performed by the business information management system 10 according to the embodiment of the present invention.

Referring to FIG. 3, in the business information management system 10, the processing unit first calculates, in its attempt to perform processing for achieving the function of the data connection accuracy information calculation section 24, the data connection accuracy between data items contained in the business information database 11 based on the work flow information contained in the business information database 11 (step S01). The processing unit then stores the calculated data connection accuracy in the data connection accuracy information storage section 15. A method of calculating the data connection accuracy will be described in detail separately with reference to FIG. 19. An appropriate value may be set as appropriately for the data connection accuracy by the administrator or the user of the business information management system 10, instead of the data connection accuracy being calculated by the processing unit based on the work flow information.

The administrator or the user of the business information management system 10 may thereafter input change data for changing data contained in the business information database 11 from a keyboard or other type of input unit. The processing unit then reads, in order to perform processing for achieving the function of the data change section 12, the change data inputted by the administrator or the user and modifies the data items contained in the business information database 11 to be changed in accordance with the data read (step S02).

In performing processing for achieving the function of the change affected data extraction section 14, the processing unit refers to the data connection relationship information storage section 13 and traces first data items having the connection relationship with the data item changed in step S02 and second data items having the connection relationship with the first data items until there is no connection relationship existing. The processing unit thereby extracts the change affected data affected by the change data (step S03). When performing the foregoing processing, the processing unit refers to the data connection condition information storage section 18 and thereby determines whether there are data connection conditions set for the foregoing data connection relationship. If there are set the data connection conditions, the processing unit determines that the data connection relationship holds when the data connection conditions are satisfied.

In performing processing for achieving the function of the change effect probability calculation section 16, the processing unit reads the data connection accuracy of the change affected data extracted in step S03 from the data connection accuracy information storage section 15. The processing unit then calculates the change effect probability based on the data connection accuracy read and the data connection relationship from the change data to the change affected data in question (which depends on the connection path concerned as will be described later) (step S04).

In performing processing for achieving the function of the change affected data display section 17, the processing unit displays on the display unit the change affected data extracted in step S03 and the change effect probability calculated in step S04 (step SOS). Further, in performing processing for achieving the function of the change affected data notification section 19, the processing unit extracts, from the person-in-charge information storage section 20, the person in charge concerned with the change affected data for each of the data items having the change effect probability values equal to, or more than, a predetermined value. The processing unit thereby notifies the extracted persons in charge of the change affected data and the change effect probability (step S06).

In performing processing for achieving the functions of the change cost calculation section 21 and the change cost display section 23, the processing unit calculates the change cost of the change affected data, for each of the change affected data items extracted in step S03. Specifically, the processing unit calculates the change cost by using the product of the change cost stored in the change cost information storage section 22 for that particular change affected data item and the change effect probability calculated in step S04 for that particular change affected data item. Further, the processing unit displays the calculated change cost on the display unit (step S07).

FIGS. 4A, 4B, and 4C are tables showing typical compositions of data for each category of data constituting part of the business information database 11 according to the embodiment of the present invention. Specifically, FIG. 4A shows an example of work flow information. FIG. 4B shows an example of contract information. FIG. 4C shows an example of product information.

The work flow information represents a work performance flow. Referring to FIG. 4A, the work flow information includes fields of common ID (101), WF-ID (102), P-No (103), process name (104), branch condition (105), upper level P-No (106), lower level P-No (107), and the like; where common ID (101) represents identification information used to identify uniquely each of the data items constituting the business information database 11; WF-ID (102) represents identification information used to identify uniquely the work flow; P-No (103) represents information used to identify the process constituting the work flow; branch condition (105) represents the condition for allowing the process of the work flow to branch; upper level P-No (106) represents P-No of a process to which a current process in question is connected upwardly; and lower level P-No (107) represents P-No of a process to which the current process in question is connected downwardly.

It should be noted that the process, to which the current process in question is connected upwardly, is performed prior to the current process in question and initiates performance of the current process in question. In addition, the process, to which the current process in question is connected downwardly, is performed after the current process in question and initiated by the current process in question.

The contract information is concerned with agreements made with customers concerning design, manufacture, and sale of a product, and the like. Referring to FIG. 4B, the contract information includes fields of common ID (108), CO-ID (109), A-No (110), contract clause name (111), contract clause detail (112), and the like; where CO-ID (109) represents identification information used to identify uniquely each of the contracts made with customers; and A-No (110) represents identification information used to identify the contract clause contained in the contract.

The product information is concerned with parts that make up the product. Referring to FIG. 4C, the product information includes fields of common ID (113), product ID (114), part No (115), part name (116), part CAD information ID (117), and the like; where product ID (114) represents identification information used to identify uniquely the product; part No (115) represents identification information used to identify parts that make up the product; and part CAD information ID (117) represents link information to be linked to part CAD information for the specific part in question.

The business information database 11 includes a large variety of information in addition to the foregoing. Typically, in accordance with the embodiment of the present invention, each of the data items that constitute the business information database 11 is appended with the common ID (101, 108, 113) so that the data item can be uniquely identified.

FIG. 5 is a view showing a typical change data input screen displayed on the display unit during processing performed for achieving the function of the data change section 12 according to the embodiment of the present invention. Referring to FIG. 5, a change data input screen 50 displays a data category selection field 201, a data list display field 202, a data detail display field 204, and the like. Specifically, the data category selection field 201 allows a specific data category of the change data to be selected. The data list display field 202 shows a list of data items registered in the data category selected in the data category selection field 201. The data detail display field 204 shows specific details of the data item specified in the data list display field 202. In addition, the change data input screen 50 also displays a "change validate" button 205 used to validate the change data, a "cancel" button 206 used to cancel the change data, and other buttons.

Figure 6:
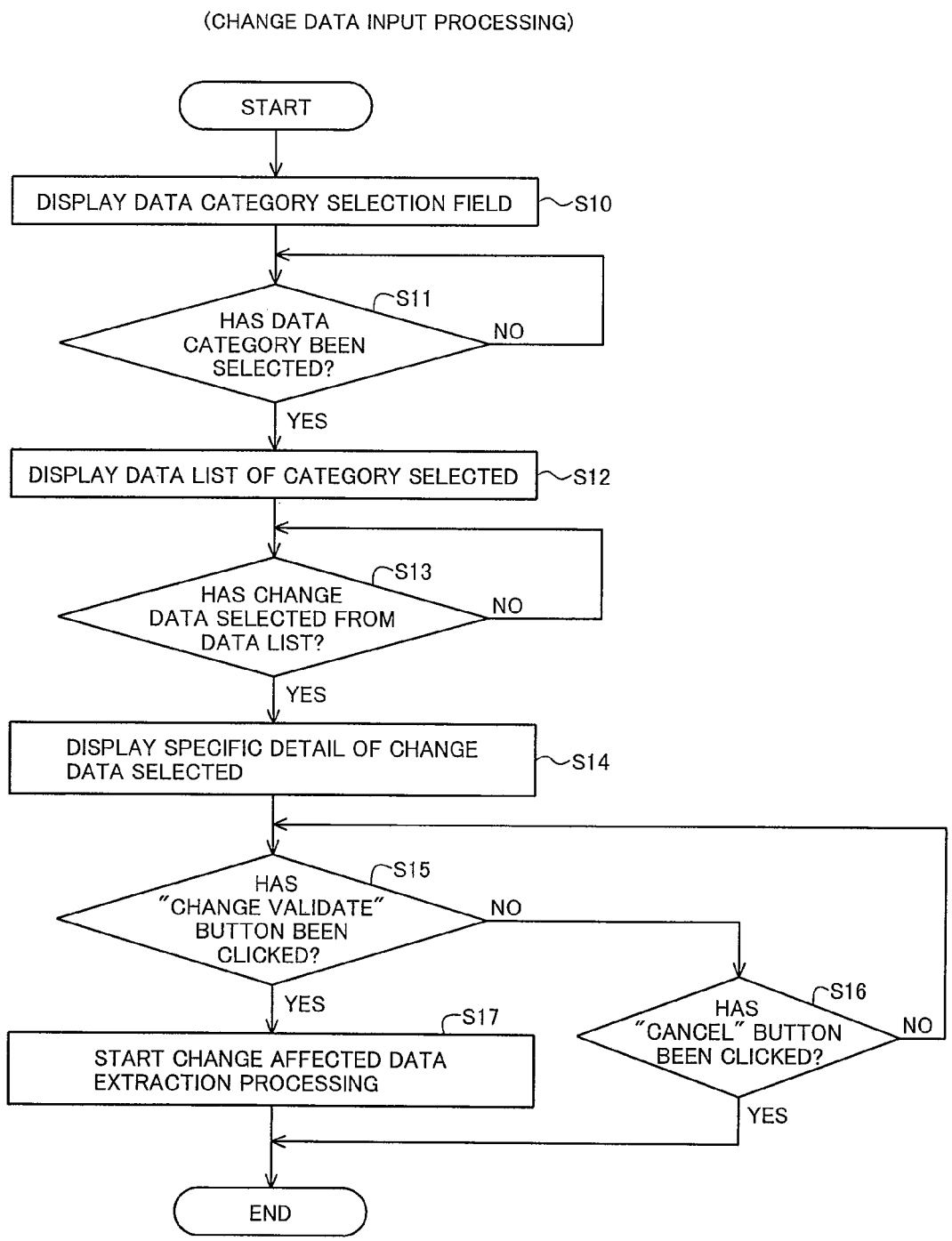
FIG. 6 is a flowchart showing a typical flow of change data input processing performed for achieving the function of the data change section according to the embodiment of the present invention.

By way of reference, in FIG. 5, a check mark 203 is entered in a box of contract clause name (data name) corresponding to "EXCHANGE RISK" displayed in the data list display field 202 and the data detail display field 204 shows "BORNE BY CUSTOMER." Specifically, the change data input screen 50 shown in FIG. 5 shows that the name of the data to be changed is "EXCHANGE RISK" and the specific details of the data is "BORNE BY CUSTOMER." FIG. 6 is a flowchart showing a typical flow of change data input processing performed for achieving the function of the data change section 12 according to the embodiment of the present invention. Referring to FIG. 6, the processing unit of the computer for the business information management system 10 first displays, after having started the change data input processing, the data category selection field 201 among other elements of the change data input screen 50 (step S10). When the data category selection field 201 is then clicked, the processing unit displays the list of data categories through a drop-down system or the like.

The user is now able to select a specific data category, within which the data to be changed falls, by clicking the corresponding data category as selected from the data category list. Specifically, the processing unit determines whether or not the data category has been selected (step S11). If it is determined that the data category is yet to be selected (step S11 is answered No), the processing unit determines a second time whether or not the data category has been selected (step S11). If it is determined that the data category has been selected (step S11 is answered Yes), on the other hand, the processing unit extracts from the business information database 11 the data list corresponding to the data category selected and displays the list in the data list display field 202 (step S12).

The user then selects the data to be changed (hereinafter may be abbreviated to "change data") by, for example, putting the check mark 203 in the data list display field 202 displayed. Specifically, the processing unit determines whether or not the change data has been selected from the data list (step S13). If it is determined that the change data is yet to be selected (step S13 is answered No), the processing unit determines a second time whether or not the change data has been selected (step S13). If it is determined that the change data has been selected (step S13 is answered Yes), on the other hand, the processing unit displays the specific detail of the change data selected in the data detail display field 204 (step S14).

The user thereafter changes, as appropriate and as necessary, the specific detail of the change data displayed in the data detail display field 204. To validate the changed change data, the user clicks the "change validate" button 205; or to cancel the change data, the user clicks the "cancel" button 206. Specifically, the processing unit, after having acquired the change data by way of the data detail display field 204, determines whether or not the "change validate" button 205 has been clicked (step S15). If it is determined that the "change validate" button 205 has been clicked (step S15 is answered Yes), the processing unit changes the data to be changed in the business information database 11 by using the change data. The processing unit further starts change affected extraction processing (step S17) to complete the change data input processing.

If it is determined that the "change validate" button 205 has not been clicked (step S15 is answered No), on the other hand, the processing unit further determines whether or not the "cancel" button 206 has been clicked (step S16). If it is determined that the "cancel" button 206 has not been clicked (step S16 is answered No), the processing unit determines a second time whether or not the "cancel" button 206 has been clicked (step S15). If it is determined that the "cancel" button 206 has been clicked (step S16 is answered Yes), the processing unit completes the change data input processing without having made any change in the business information database 11.

FIG. 7 is a table showing typical compositions of data relating to data connection relationship information stored in the data connection relationship information storage section 13 according to the embodiment of the present invention. FIG. 8 is a table showing typical compositions of data relating to data connection condition information stored in the data connection condition information storage section 18 according to the embodiment of the present invention.

Referring to FIG. 7, the data connection relationship information includes fields of source data 301 and destination data 302. A list of common IDs of the corresponding data items is stored in each of these fields. It should be noted that the destination data refers to a type of data having a connection relationship with the source data. By saying that "the destination data has the connection relationship with the source data," it is meant that the destination data is likely to be affected by a change made in the source data. For example, changing exchange risk can affect to change payment terms, defect guarantee period, order value, parts making up a product, and the like. These data items thus constitute the destination data of exchange risk (source data). In this specification, the fact that the source data has a connection relationship with the destination data may be described as "the destination data connected to the source data" or the like.

Referring to FIG. 8, the data connection condition information includes fields of source data 401, destination data 402, and connection condition 403. A list of common IDs of the corresponding data items is stored in each of the source data 401 and destination data 402 fields. A connection condition validating the connection relationship between the source data 401 and the destination data 402 is stored in the connection condition 403 field. Specifically, the connection relationship between the source data 401 and the destination data 402 is valid on condition that the connection condition 403 is satisfied.

Figure 9:
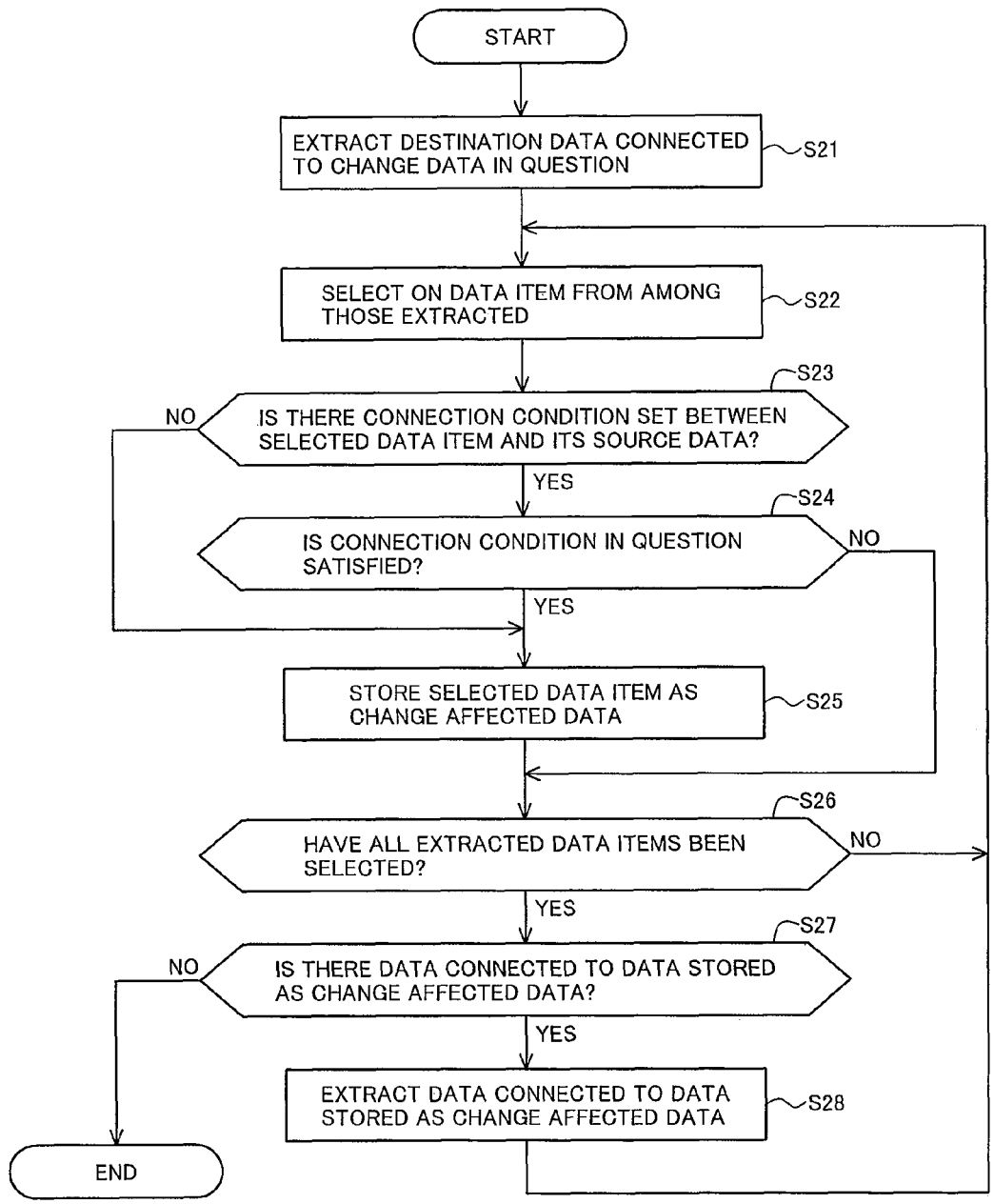
FIG. 9 is a flowchart showing a typical flow of change affected data extraction processing performed for achieving the function of a change affected data extraction section according to the embodiment of the present invention.

FIG. 9 is a flowchart showing a typical flow of change affected data extraction processing performed for achieving the function of the change affected data extraction section 14 according to the embodiment of the present invention. The processing unit of the computer for the business information management system 10 first refers to the data connection relationship information storage section 13 and thereby extracts destination data items connected to the change data in question (data changed in the change data input processing shown in FIG. 6) (step S21).

The processing unit then selects a single data item from among those extracted (step S22). By referring to the data connection condition information storage section 18, the processing unit determines whether there is set a connection condition between the data item selected and the source data (step S23). If it is determined that there is set a connection condition between the data item selected and the source data (step S23 is answered Yes), the processing unit refers to the business information database 11 or the like and determines further whether or not the connection condition in question is satisfied (step S24). If it is then determined that the connection condition in question is satisfied (step S24 is answered Yes), the processing unit stores the data item selected in a predetermined region in the storage unit as changed affected data (step S25).

If it is determined in step S23 that there is not set any connection condition between the data item selected and the source data (step S23 is answered No), the processing unit skips the determination processing of step S24. If it is determined in step S24 that the connection condition in question is not satisfied (step S24 is answered No), the processing unit skips the processing of step S25. Specifically, in this case, the data item selected in step S22 is not regarded as the change affected data.

When performing step S25, the processing unit also executes processing for storing the number of links of the connection path connecting the change data and the data item in question in step S21 as level count in a predetermined region of the storage unit. The level count is, in this case, properly keyed to the data item in question (change affected data). The "link" as the term is herein used refers to a connection path directly connecting together two different data items.

The processing unit next determines (in step S26) whether or not all data items extracted in step S21 or step S28 to be described later have been selected (in step S22). If it is determined that not all data items extracted have been selected (step S26 is answered No), the processing unit returns the processing back to step S22 and re-executes processing of step S22 and onward a second time.

If it is determined that all data items extracted have been selected (step S26 is answered Yes), on the other hand, the processing unit determines, for each of the data items stored as the change affected data in step S25, whether or not there is data connected to that specific change affected data by referring to the data connection relationship information storage section 13 (step S27). If it is determined as a result that there is data that is connected to that specific change affected data (step S27 is answered Yes), the processing unit extracts data connected to the change affected data from the data connection relationship information storage section 13 (step S28). The processing unit then returns the processing back to step S22. If it is determined that there is no data connected to the change affected data (step S27 is answered No), the processing unit terminates the change affected data extraction processing.

FIG. 10 is a table showing typical compositions of data relating to data connection accuracy information stored in the data connection accuracy information storage section 15 according to the embodiment of the present invention. Referring to FIG. 10, the data connection accuracy information includes fields of source data 501, destination data 502, and connection accuracy 503. A list of common IDs of the corresponding data items is stored in each of the source data 501 and destination data 502 fields. Stored in the connection accuracy 503 field is the connection accuracy represented by real values of from 0 to 1 indicating the depth of connection accuracy between the source data 501 and the destination data 502. The depth of connection accuracy is 0 when there is no connection relationship existing at all. The depth of connection accuracy is 1 when there is a positive connection relationship existing.

Figure 11:
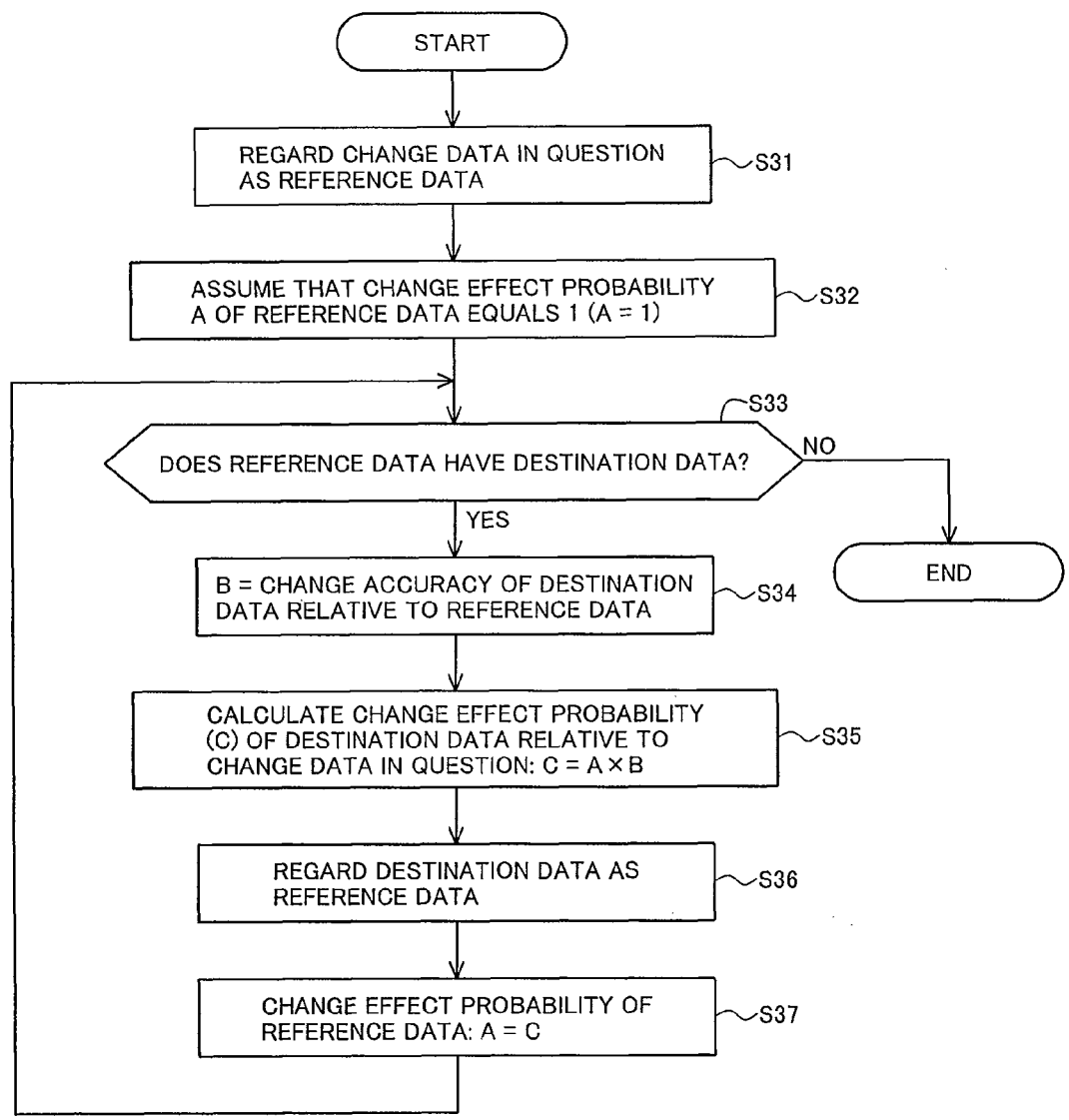
FIG. 11 is a flowchart showing a typical flow of change effect probability calculation processing performed for achieving the function of a change effect probability calculation section according to the embodiment of the present invention.

FIG. 11 is a flowchart showing a typical flow of change effect probability calculation processing performed for achieving the function of the change effect probability calculation section 16 according to the embodiment of the present invention. The processing unit of the computer for the business information management system 10 first regards the change data in question (data changed in the change data input processing shown in FIG. 6) as reference data (step S31) and assumes that change effect probability A of the reference data equals 1 (step S32).

The processing unit then determines whether or not the reference data has destination data (step S33). Herein, the reference data has the destination data if it is found that, by referring to the data connection relationship information storage section 13, there is destination data connected to the reference data and the destination data is included in the change affected data extracted through the change affected data extraction processing shown in FIG. 9.

If it is then determined that the reference data has the destination data (step S33 is answered Yes), the processing unit refers to the data connection accuracy information storage section 15 to find the change accuracy of the destination data relative to the reference data. The processing unit then lets the change accuracy be denoted as B (step S34). The processing unit calculates change effect probability C of the destination data relative to the change data in question from equation C=A×B (step S35). At this time, the processing unit stores the change effect probability C obtained through the foregoing calculation in a predetermined region in the storage unit with proper correspondence provided with the destination data.

The processing unit then regards the destination data as the reference data (step S36) and the change effect probability A of the reference data as being equal to C (step S37). The processing unit then returns the processing to step S33 and re-executes processing of step S33 and onward a second time. If, in the determination made in step S33, it is found that the reference data has no destination data (step S33 is answered No), the processing unit terminates the change effect probability calculation processing.

According to the above-described change effect probability calculation processing, the change effect probability of a given change affected data item is calculated as the product of all connection accuracy values which the links constituting the connection path between the change data and the change affected data items have.

FIG. 12 is a view showing a typical change affected data display screen displayed on the display unit during processing performed for achieving the function of the change affected data display section 17 according to the embodiment of the present invention. Referring to FIG. 12, a change affected data display screen 70 includes a change data display field 701. The display screen 70 further includes fields relating to the change affected data: a category display field 702; a data name display field 703; a connection level (connection LV) display field 704, and a change effect probability display field 705. After having executed the change effect probability calculation processing shown in FIG. 11, the processing unit displays the change affected data and the change effect probability thereof in the respective fields of the change affected data display screen 70.

The change affected data display screen 70 further includes a "notify person-in-charge" button 706, a "calculate change cost" button 707, and a "return" button 708. When the administrator or the user of the business information management system 10 clicks the "notify person-in-charge" button 706, the processing unit executes processing for achieving the function of the change affected data notification section 19. When the administrator or user clicks the "calculate change cost" button 707, the processing unit executes processing for achieving the function of the change cost calculation section 21. When the administrator or user clicks the "return" button 708, the processing unit erases the change affected data display screen 70 and, instead, redisplays the change data input screen 50 shown in FIG. 5.

FIG. 13 is a table showing typical compositions of data relating to person-in-charge information stored in the person-in-charge information storage section 20 according to the embodiment of the present invention. Referring to FIG. 13, the person-in-charge information includes fields of common ID (601), name of person-in-charge (602), title (603), e-mail address (604), and the like. The common ID (601) represents identification information used to identify uniquely each of the data items constituting the business information database 11. Accordingly, the person-in-charge information provides information on the name (602) of the person in charge, the title (603) of the person in charge, the e-mail address (604), at which the person in charge is notified, and the like.

Figure 14:
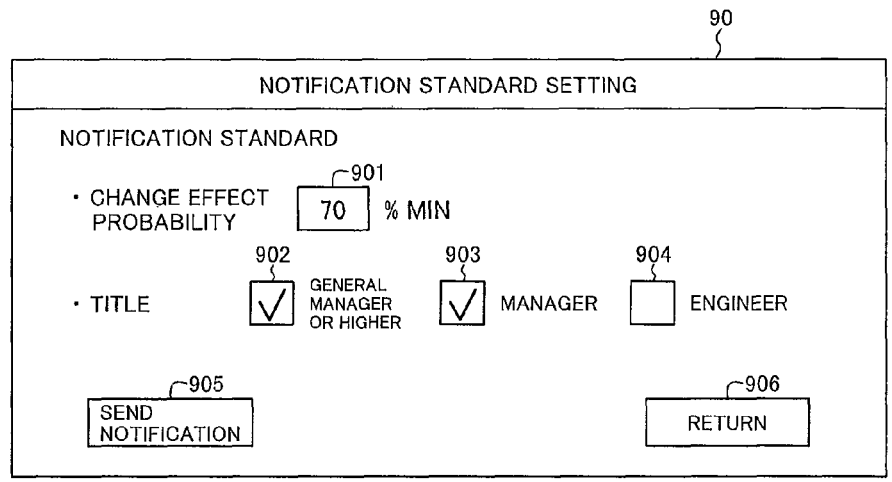
FIG. 14 is a view showing a typical notification standard setting screen displayed on the display unit during processing performed for achieving the function of a change affected data notification section according to the embodiment of the present invention.

FIG. 14 is a view showing a typical notification standard setting screen displayed on the display unit during processing performed for achieving the function of the change affected data notification section 19 according to the embodiment of the present invention. Referring to FIG. 14, a notification standard setting screen 90 includes a change effect probability setting field 901 and title selection check boxes 902, 903, 904. The change effect probability setting field 901 is a field in which a lower limit value for sending notification is to be set. The title selection check boxes 902, 903, 904 are used to allow the administrator or the user of the business information management system 10 to select the title of the person to whom the notification is to be sent. Accordingly, the administrator or the user of the system 10 is able to set the lower limit value of the change effect probability for sending notification and the title of the person, to whom notification is to be sent.

The notification standard setting screen 90 further includes a "send notification" button 905 and a "return" button 906. When the administrator or the user of the system 10 clicks the "send notification" button 905, the processing unit executes change affected data notification processing to be described with reference to FIG. 15 below. If the administrator or the user of the system 10 clicks the "return" button 906, the processing unit erases the notification standard setting screen 90 and, instead, redisplays the change affected data display screen 70.

Figure 15:
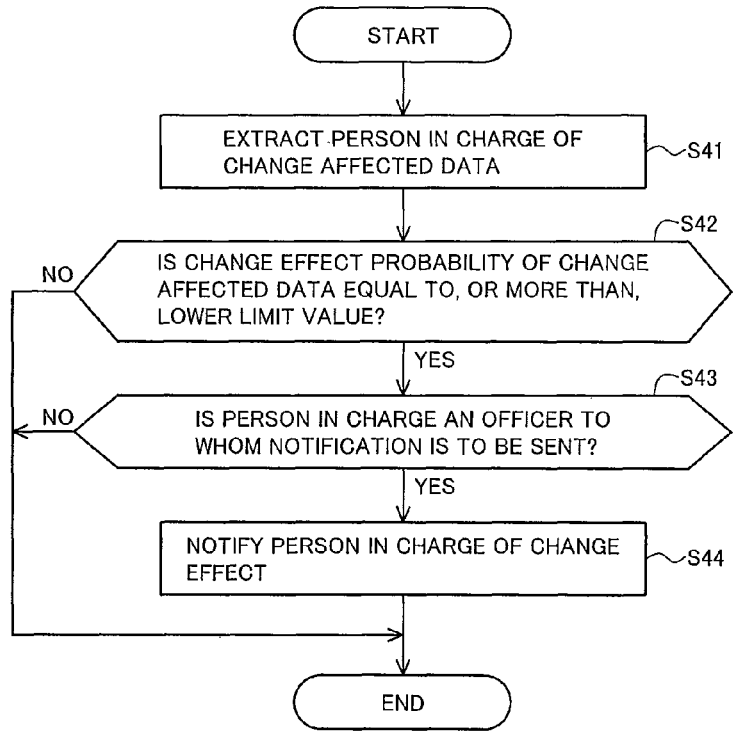
FIG. 15 is a flowchart showing a typical flow of change affected data notification processing performed for achieving the function of the change affected data notification section according to the embodiment of the present invention.

FIG. 15 is a flowchart showing a typical flow of change affected data notification processing performed for achieving the function of the change affected data notification section 19 according to the embodiment of the present invention. The processing unit of the computer for the business information management system 10 first refers to the person-in-charge information storage section 20 to extract persons in charge concerned with the change affected data extracted through the change affected data extraction processing shown in FIG. 9 (step S41). The processing unit then determines whether or not the change effect probability of the change affected data is equal to, or more than, the lower limit value set in the notification standard setting screen 90 (step S42). If it is determined that the change effect probability is the lower limit value or more (step S42 is answered Yes), the processing unit further determines whether or not the person in charge is an officer to whom notification is to be sent, as set in the notification standard setting screen 90 (step S43).

If it is determined that the person in charge is an officer to whom notification is to be sent (step S43 is answered Yes), the processing unit notifies the person in charge that the data of which the person is in charge is affected by the change made (step S44). The processing unit performs this notification process by acquiring the e-mail address of the person in charge in question from the person-in-charge information storage section 20 and sending e-mail describing the change data, change affected data, change effect probability, and the like to that e-mail address.

If, on the other hand, the change effect probability of the change affected data falls short of the lower limit value (step S42 is answered No), or if the person in charge is not an officer to whom notification is to be sent (step S43 is answered No), the processing unit terminates the change affected data notification processing without sending any notification.

Figures 16, 17:
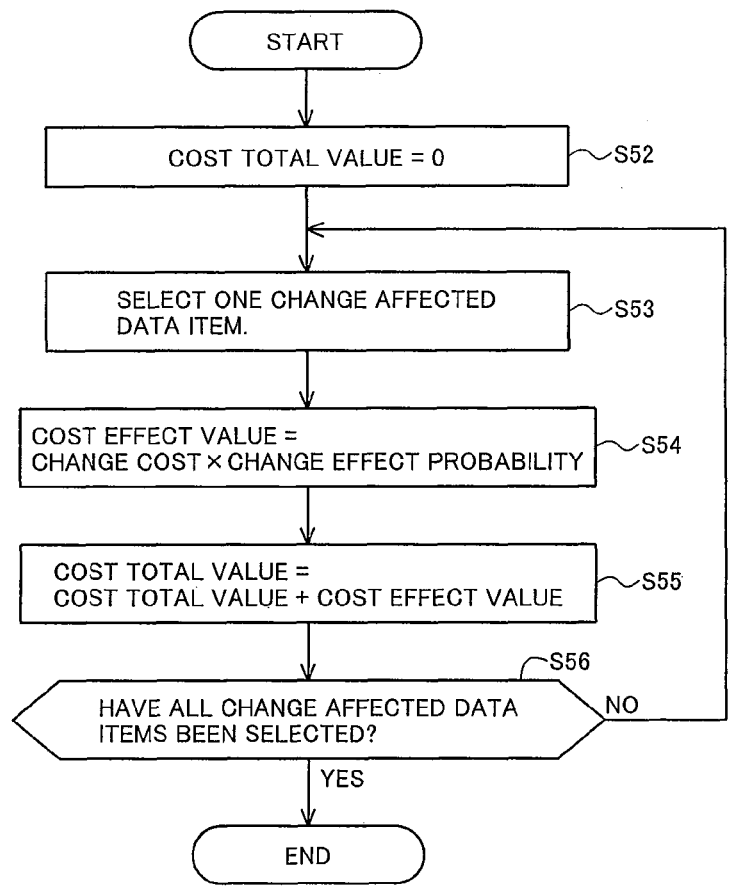
FIG. 16 is a table showing typical compositions of data relating to change cost information stored in a change cost information storage section according to the embodiment of the present invention.
FIG. 17 is a flowchart showing a typical flow of change cost calculation processing performed for achieving the function of a change cost calculation section according to the embodiment of the present invention.

FIG. 16 is a table showing typical compositions of data relating to change cost information stored in the change cost information storage section 22 according to the embodiment of the present invention. Referring to FIG. 16, the change cost information includes fields of source data 801, destination data 802, and change cost 803. Common IDs of the corresponding data items are stored in each of the source data 801 and destination data 802 fields. Values of the change cost are stored in the change cost 803 field.

FIG. 17 is a flowchart showing a typical flow of change cost calculation processing performed for achieving the function of the change cost calculation section 21 according to the embodiment of the present invention. The change cost calculation processing is started when the "calculate change cost" button 707 is clicked in the change affected data display screen 70 shown in FIG. 12. The change cost calculation processing lies in finding a sum (total value) of the change cost that takes into consideration the change effect probability calculated through the processing for achieving the function of the change effect probability calculation section 16, for the change affected data extracted through the processing for achieving the function of the change affected data extraction section 14.

The processing unit of the computer for the business information management system 10 first initializes a "cost total value," a variable for accumulating the change cost; specifically, the processing unit resets the cost total value to 0 (step S52). It is to be noted that the change affected data when a given data item is changed is stored in the predetermined region in the storage unit as a result of the processing performed for achieving the function of the change affected data extraction section 14. The processing unit therefore selects a single change affected data item (step S53).

The processing unit next obtains the change cost of the change affected data from the change cost information storage section 22. Further, the processing unit reads the change effect probability of the change affected data, which has been calculated through the processing performed for achieving the function of the change effect probability calculation section 16 and stored in the predetermined region in the storage unit. Then, using the following equation (1), the processing unit calculates a cost effect value of the change affected data (step S54).

Cost effect value=change cost×change effect probability  Equation (1)

The processing unit next accumulates the cost total value using the following equation (2) (step S55).

Cost total value=cost total value+cost  Equation (2)

The processing unit then determines whether or not all change affected data items stored in the predetermined region in the storage unit have been selected in the processing of step S53 (step S56). If it is determined that not all change affected data items have been selected (step S56 is answered No), the processing unit returns the processing back to step S53 and re-executes processing of step S53 and onward. If it is determined that all change affected data items have been selected (step S56 is answered Yes), the processing unit completes the change cost calculation processing. It should be noted that a value stored in the variable "cost total value" at the time of completion of the processing is the sum total of the change cost as a result of the change of the change data in question.

FIG. 18 is a view showing a typical change cost estimated value display screen displayed on the display unit during processing performed for achieving the function of the change cost display section 23 according to the embodiment of the present invention. Referring to FIG. 18, a change cost estimated value display screen 130 includes a change data display field 1301. The display screen 130 further includes fields relating to the change affected data: a category display field 1302; a data name display field 1303; and a cost effect value display field 1304. In addition, the display screen 130 also includes a cost effect value total value display field 1305. After having executed the change cost calculation processing shown in FIG. 17, the processing unit displays the cost effect value and the total value thereof in the respective display fields of the change cost estimated value display screen 130.

The change cost estimated value display screen 130 further includes a "return" button 1306. When the administrator or the user of the system 10 clicks the "return" button 1306, the processing unit erases the change cost estimated value display screen 130 being displayed and, instead, redisplays the change affected data display screen 70.

As described heretofore, according to the embodiment of the present invention, the processing unit of the computer for the business information management system 10 stores, for the data items constituting the business information database 11, the data connection relationship information in the data connection relationship information storage section 13 and the data connection condition information in the data connection condition information storage section 18. When a specific data item stored in the business information database 11 is changed, therefore, the processing unit can easily extract data items affected by this change (change affected data). In addition, for the connection relationship between a pair of two different data items stored in the data connection relationship information storage section 13, the depth of connection relationship is set and stored as the data connection accuracy represented, for example, by real values of from 0 to 1 indicating the depth of connection accuracy, instead of an integer of 0 or 1. This allows the processing unit to calculate the change effect probability representing the degree of effect resulting from the change made for the change affected data.

The processing unit also displays the change affected data and the change effect probability thereof on the display unit as the change affected data display screen 70. When a specific data item is changed, therefore, the administrator or the user of the business information management system 10 is able to know specific data items affected by the changed data item, including the degree of effect from the change.

In accordance with the embodiment of the present invention, the processing unit stores, for each of the data items constituting the business information database 11, the person in charge of each data item in the person-in-charge information storage section 20. As a result, when the change effect probability of the change affected data becomes equal to, or more than, the predetermined value, the person in charge of the specific data item can be so informed quickly. In addition, the processing unit stores, for each of the data items constituting the business information database 11, the change cost of each of the data items in the change cost information storage section 22. The administrator or the user of the business information management system 10 can easily assess the change cost as a result of the change of the data.

In accordance with the embodiment of the present invention, therefore, when a specific data item stored in the business information database 11 is changed, the business information management system 1 can extract data items that are only vaguely associated with the change data. This effectively prevents a change or reassessment of other data items required as a result of the change of the original data item from being omitted. As a result, reliability of the business information can be enhanced.

In accordance with the embodiment of the present invention, it is necessary to store in advance the data for the data connection relationship information storage section 13, the data connection condition information storage section 18, the data connection accuracy information storage section 15, the person-in-charge information storage section 20, and the change cost information storage section 22, together with the data in the business information database 11. Particularly with the data connection accuracy information stored in the data connection accuracy information storage section 15 of the foregoing types of data, it is considered to be heavily burdened for the administrator or the user of the business information management system 10 to set. An example will therefore be described below of the processing unit's calculating automatically the data connection accuracy information based on the business information database 11.

Figure 19:
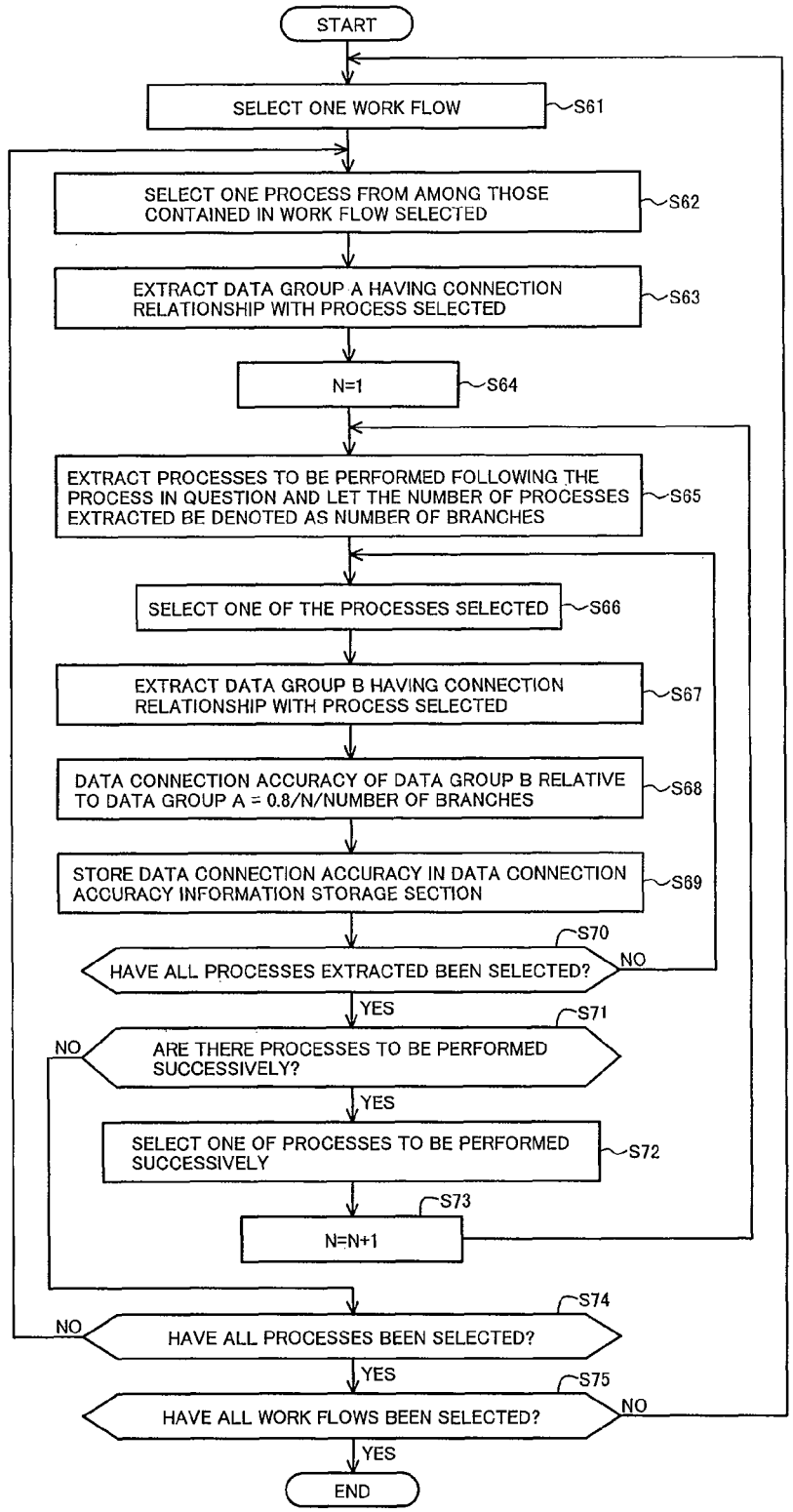
FIG. 19 is a flowchart showing a typical flow of data connection accuracy information calculation processing performed for achieving the function of a data connection accuracy information calculation section according to the embodiment of the present invention.

FIG. 19 is a flowchart showing a typical flow of data connection accuracy information calculation processing performed for achieving the function of the data connection accuracy information calculation section 24 according to the embodiment of the present invention. Referring to FIG. 19, the processing unit of the computer for the business information management system 10 first selects a single work flow (step S61) from the business information database 11 (see FIGS. 4A to 4C) and then selects a single process contained in the work flow information of the work flow selected earlier (step S62). The processing unit then refers to the data connection relationship information storage section 13 (see FIG. 7) and extracts data items having a connection relationship with the selected process. The processing unit lets the extracted data items be denoted as a data group A (step S63). Next, the processing unit initializes a number N representing a connection distance between processes, resetting the number N to 1 (step S64).

The processing unit next refers to the lower level P-No field of the work flow information (see FIG. 4A) and extracts a single process or a plurality of processes to be performed following the above-referenced process (the work flow that branches under certain conditions involves a plurality of processes). The processing unit then lets the number of processes extracted be denoted as the number of branches (step S65). Further, the processing unit selects one of the processes extracted in step S65 (step S66). The processing unit then refers to the data connection relationship information storage section 13 and extracts data items having a connection relationship with the process selected in step S66. The data items extracted are then denoted as a data group B (step S67).

The processing unit calculates, using the following equation (3), the data connection accuracy of the data group B relative to the data group A (step S68). The processing unit then stores the data connection accuracy calculated in the data connection accuracy information storage section 15 (step S69).

$$\text{Data connection accuracy} = 0.8/N/\text{number of branches} \quad \text{Equation (3)}$$

The processing unit next determines whether all of the processes extracted in step S65 have been selected or not (step S70). If it is determined that not all processes have been selected (step S70 is answered No), the processing unit returns the processing back to step S66 and re-executes processing of step S66 and onward. If it is determined that all of the processes extracted in step S65 have been selected (step S70 is answered Yes), on the other hand, the processing unit then refers to the lower level P-No field of the work flow information (see FIG. 4A) and determines if there are processes to be performed following the process in question (step S71).

If it is determined that there are processes to be performed successively (step S71 is answered Yes), the processing unit extracts from the work flow information the processes to be successively performed and selects one of the processes extracted (step S72). The processing unit then increments the number N representing the connection distance between processes by 1, that is, sets N to N+1 (step S73). The processing unit then returns the processing back to step S65 and re-executes processing of step S65 and onward. If it is determined in step S71 that there are no processes to be preformed successively (step S71 is answered No), the processing unit determines whether all processes contained in the work flow selected in step S61 have been selected or not (step S74).

If it is determined, as a result, that not all processes have been selected (step S74 is answered No), the processing unit returns the processing back to step S62 and re-executes processing of step S62 and onward. If it is determined that all processes have been exhaustively selected (step S74 is answered Yes), the processing unit then determines whether all work flows have been selected or not (step S75). If it is then determined that not all work flows have been selected (step S75 is answered No), the processing unit returns the processing back to step S61 and re-executes processing of step S61 and onward. If, on the other hand, it is determined all work flows have been exhaustively selected (step S75 is answered Yes), the processing unit completes the data connection accuracy information calculation processing.

In accordance with the data connection accuracy information calculation processing shown in FIG. 19, the data connection accuracy between a first data item contained in a first process of the work flow and a second data item contained in a second process to be performed after the first process depends on the number of connection links included in a process performance path connecting the first and the second processes and the number of branches of the connection links branching rearwardly from the process contained in the performance path. Herein, the term "connection link" refers to a connection path directly connecting together two difference processes.

What is claimed is:

1. A business information management system using a computer having at least an input unit and a display unit, the business information management system managing a business information database containing business-related data of a plurality of types, the computer comprising:

a processor;

a data connection relationship information storage configured to store data connection relationship information which represents data having a connection relationship with each of data items constituting the business information database;

a data connection accuracy information storage configured to store, as data connection accuracy, a numeric value which represents a depth of the connection relationship for each pair of data items having a connection relationship stored in said data connection relationship information storage;

a data change section configured to change, via the processor, at least one data item contained in the business information database in accordance with data inputted via the input unit;

a change affected data extraction section configured to obtain, via the processor, based on the data connection relationship information stored in said data connection relationship information storage, a first data item which has a connection relationship with the originally changed data item and a second data item which has a connection relationship with the first data item, until there is no longer existing connection relationship, said change affected data extraction section thereby extracting, as change affected data, all data items resident along a path connecting the above-referenced connection relationships;

a change effect probability calculation section configured to calculate, via the processor, a change effect probability of each item of the extracted change affected data based on the data connection accuracy stored in said data connection accuracy information storage; and a change affected data display section configured to display, on the display unit, the extracted change affected data and the change effect probability calculated for the change affected data;

wherein the business information database includes work flow information defining a work flow of a plurality of work processes; and wherein the computer further comprises:

a data connection accuracy information calculation section configured to select, from the work flow information via the processor, a first work process and a second work process to be carried out following the first work process, find a work process connection path leading from the first work process to the second work process based on the work flow information, and to calculate, based on the number of connection links contained in the connection path and the number of connection link branches branching rearwardly from the work process contained in the connection path, data connection accuracy between a first data item to be processed in the first work process and a second data item to be processed in the second work process;

a change cost information storage configured to store, for each item of data constituting the business information database, a change cost to be accrued when the data item is changed;

a change cost calculation section configured to calculate, for each item of the change affected data extracted by said change affected data extraction section, the change cost of the change affected data item as a product of the change cost stored in the change cost information storage section for that particular change affected data item and the change effect probability calculated for that particular change affected data item by said change effect probability calculation section, and further calculating a total value of all change cost values calculated for the change affected data items; and a change cost display section configured to display, on the display unit, at least one of the change cost value calculated for each item of the change affected data and the total value of all change cost values.

2. The business information management system according to claim 1, wherein said change effect probability calculation section is further configured to calculate the change effect probability for the change affected data by reading, for each of all change affected data items resident on the path connecting the changed data and the change affected data, a data connection accuracy value stored in said data connection accuracy information storage, and to obtain a product of all change effect probability values read.

3. The business information management system according to claim 1, wherein the computer further comprises a data connection condition information storage configured to store, for each pair of data items having a connection relationship stored in said data connection relationship information storage, information on conditions for validating the connection relationship as data connection condition information; and wherein said change affected data extraction section validates, when finding all data items having the connection relationship with the changed data until there is no longer existing connection relationship, the connection relationship on condition which the data connection condition is satisfied, if one for the connection relationship is stored in the data connection condition information storage.

4. The business information management system according to claim 1, wherein the computer further comprises:

a person-in-charge information storage configured to store, for each item of data constituting the business information database, information on a person in charge concerned with the data item; and a change affected data notification section configured to extract, if the change effect probability of the change affected data calculated by said change effect probability calculation section is equal to, or more than, a predetermined value, persons in charge concerned with the change affected data by referring to the person-in-charge information storage and notifying the extracted persons in charge of the change affected data and the change effect probability in accordance with the extracted persons in charge.

5. A business information management method for managing, by using a computer having at least an input unit and a display unit, a business information database containing business-related data of a plurality of types, the computer comprising: a data connection relationship information storage configured to store data connection relationship information which represents data having a connection relationship with each of data items constituting the business information database; and a data connection accuracy information storage configured to store, as data connection accuracy, a numeric value which represents a depth of the connection relationship for each pair of data items having a connection relationship stored in the data connection relationship information storage; the business information management method performed by the computer comprising:

changing, via the computer, at least one data item contained in the business information database in accordance with data inputted via the input unit;

obtaining, via the computer, based on the data connection relationship information stored in the data connection relationship information storage, a first data item which has a connection relationship with the originally changed data item and a second data item which has a connection relationship with the first data item, until there is no longer existing connection relationship, and extracting all data items, as change affected data, resident along a path connecting the above-referenced connection relationships;

calculating, via the computer, a change effect probability of each item of the extracted change affected data based on the data connection accuracy stored in the data connection accuracy information storage; and displaying on the display unit the extracted change affected data and the change effect probability calculated for the change affected data;

wherein the business information database includes work flow information defining a work flow of a plurality of work processes; and wherein the method further comprises:

selecting, via the computer, from the work flow information a first work process and a second work process to be carried out following the first work process, finding a work process connection path leading from the first work process to the second work process based on the work flow information, and calculating, based on the number of connection links contained in the connection path and the number of connection link branches branching rearwardly from the work process contained in the connection path, data connection accuracy between a first data item to be processed in the first work process and a second data item to be processed in the second work process;

wherein the computer further comprises a change cost information storage configured to store, for each item of data constituting the business information database, a change cost to be accrued when the data item is changed; and wherein the method further comprises:

calculating, for each item of the change affected data extracted through said extracting of change affected data, the change cost of the change affected data item as a product of the change cost stored in the change cost information storage for that particular change affected data item and the change effect probability calculated for that particular change affected data item through said calculating of the change effect probability, and further calculating a total value of all change cost values calculated for the change affected data items; and displaying on the display unit at least one of the change cost value calculated for each item of the change affected data and the total value of all change cost values.

6. The business information management method according to claim 5, further comprising:

calculating, in said calculating of the change effect probability, the change effect probability for the change affected data, including reading, for each of all change affected data items resident on the path connecting the changed data and the change affected data, a data connection accuracy value stored in the data connection accuracy information storage and obtaining a product of all change effect probability values read.

7. The business information management method according to claim 5, wherein the computer further comprises a data connection condition information storage configured to store, for each pair of data items having a connection relationship stored in the data connection relationship information storage, information on conditions for validating the connection relationship as data connection condition information; and wherein the method further comprises:

validating the connection relationship on condition which the data connection condition is satisfied, in said obtaining of the first data item and the second data item, all data items having the connection relationship with the changed data, until there is no longer existing connection relationship, if one for the connection relationship is stored in the data connection condition information storage.

8. The business information management method according to claim 5, wherein the computer further comprises a person-in-charge information storage configured to store, for each item of data constituting the business information database, information on a person in charge concerned with the data item; and wherein the method further comprises:

extracting, if the change effect probability of the change affected data calculated through said step of calculating the change effect probability is equal to, or more than, a predetermined value, persons in charge concerned with the change affected data, including referring to the person-in-charge information storage and notifying the extracted persons in charge of the change affected data and the change effect probability in accordance with the extracted persons in charge.

9. A non-transitory computer-readable medium embodying a business information management program for letting a computer having at least an input unit and a display unit manage a business information database containing business-related data of a plurality of types, the computer comprising a data connection relationship information storage configured to store data connection relationship information which represents data having a connection relationship with each of data items constituting the business information database, and a data connection accuracy information storage configured to store, as data connection accuracy, a numeric value which represents a depth of the connection relationship for each pair of data items having a connection relationship stored in the data connection relationship information storage; the business information management program letting the computer execute:

changing at least one data item contained in the business information database in accordance with data inputted via the input unit;

obtaining, based on the data connection relationship information stored in the data connection relationship information storage, a first data item which has a connection relationship with the originally changed data item and a second data item which has a connection relationship with the first data item, until there is no longer existing connection relationship, and extracting all data items, as change affected data, resident along a path connecting the above-referenced connection relationships;

calculating a change effect probability of each item of the extracted change affected data based on the data connection accuracy stored in the data connection accuracy information storage; and displaying on the display unit the extracted change affected data and the change effect probability calculated for the change affected data;

wherein the business information database includes work flow information defining a work flow of a plurality of work processes; and wherein the program further lets the computer execute:

selecting from the work flow information a first work process and a second work process to be carried out following the first work process, finding a work process connection path leading from the first work process to the second work process based on the work flow information, and calculating, based on the number of connection links contained in the connection path and the number of connection link branches branching rearwardly from the work process contained in the connection path, data connection accuracy between a first data item to be processed in the first work process and a second data item to be processed in the second work process;

wherein the computer further comprises a change cost information storage configured to store, for each item of data constituting the business information database, a change cost to be accrued when the data item is changed; and wherein the program lets the computer execute:

calculating, for each item of the change affected data extracted through said extracting of change affected data, the change cost of the change affected data item as a product of the change cost stored in the change cost information storage for that particular change affected data item and the change effect probability calculated for that particular change affected data item through said calculating of the change effect probability, and further calculating a total value of all change cost values calculated for the change affected data items; and displaying on the display unit at least one of the change cost value calculated for each item of the change affected data and the total value of all change cost values.

10. The non-transitory computer-readable medium embodying the business information management program according to claim 9, wherein the program lets the computer execute:

calculating, in said calculating of the change effect probability, the change effect probability for the change affected data, including reading, for each of all change affected data items resident on the path connecting the changed data and the change affected data, a data connection accuracy value stored in the data connection accuracy information storage and obtaining a product of all change effect probability values read.

11. The non-transitory computer-readable medium embodying the business information management program according to claim 9, wherein the computer further comprises a data connection condition information storage configured to store, for each pair of data items having a connection relationship stored in the data connection relationship information storage, information on conditions for validating the connection relationship as data connection condition information; and wherein the program lets the computer execute:

validating the connection relationship on condition which the data connection condition is satisfied, in said obtaining of the first data item and the second data item, all data items having the connection relationship with the changed data, until there is no longer existing connection relationship, if one for the connection relationship is stored in the data connection condition information storage.

12. The non-transitory computer-readable medium embodying the business information management program according to claim 9, wherein the computer further comprises a person-in-charge information storage for storing, for each item of data constituting the business information database, information on a person in charge concerned with the data item; and wherein the program further lets the computer execute:

extracting, if the change effect probability of the change affected data calculated through said calculating of the change effect probability is equal to, or more than, a predetermined value, persons in charge concerned with the change affected data, including referring to the person-in-charge information storage and notifying the extracted persons in charge of the change affected data and the change effect probability in accordance with the extracted persons in charge.

\* \* \* \* \*